United States Patent
Kushibiki et al.

(10) Patent No.: US 6,725,557 B2
(45) Date of Patent: Apr. 27, 2004

(54) THICKNESS MEASURING APPARATUS AND METHOD

(75) Inventors: Jun-ichi Kushibiki, 2-71, Yamada-honcho, Taihaku-ku, Sendai-shi, Miyagi (JP), 982-0816; Mototaka Arakawa, Miyagi (JP); Ryoichi Okabe, Hokkaido (JP)

(73) Assignee: Jun-ichi Kushibiki, Miyagi (JP)

( * ) Notice: Subject to any disclaimer, the term of this patent is extended or adjusted under 35 U.S.C. 154(b) by 0 days.

(21) Appl. No.: 10/086,747

(22) Filed: Feb. 28, 2002

(65) Prior Publication Data
US 2002/0152625 A1 Oct. 24, 2002

(30) Foreign Application Priority Data
Mar. 5, 2001 (JP) .......................................... 2001-059587

(51) Int. Cl.$^7$ ................................................ G01B 5/06
(52) U.S. Cl. ............................ 33/555; 33/832; 33/783; 269/21; 356/625
(58) Field of Search ........................ 33/555, 832, 833, 33/834, 549, DIG. 2, 573, 703, 704; 269/21, 289 R; 248/309.1, 309.2, 310; 356/625, 630, 631, 632, 399–401, 614, 622, 623

(56) References Cited

U.S. PATENT DOCUMENTS

| | | | | |
|---|---|---|---|---|
| 2,352,571 A | * | 6/1944 | Sprigg ......................... | 33/803 |
| 2,412,665 A |  | 12/1946 | Young | |
| 4,805,310 A |  | 2/1989 | Fernand | |
| 4,989,031 A | * | 1/1991 | Kamiya ....................... | 355/30 |
| 5,307,149 A | * | 4/1994 | Palm et al. .................. | 356/614 |
| 5,923,408 A | * | 7/1999 | Takabayashi ................ | 355/53 |
| 5,954,908 A | * | 9/1999 | Amo et al. .................. | 156/285 |
| 6,014,886 A |  | 1/2000 | Anderson et al. | |
| 6,056,825 A | * | 5/2000 | Sumnitsch .................. | 118/730 |
| 6,151,792 A | * | 11/2000 | Ohlig et al. ................. | 33/613 |
| 6,219,931 B1 | * | 4/2001 | Roth ............................ | 33/645 |
| 6,286,685 B1 | * | 9/2001 | Kononchuk et al. ........ | 209/2 |
| 6,307,620 B1 | * | 10/2001 | Takabayashi et al. ....... | 355/72 |
| 6,450,288 B1 | * | 9/2002 | Akiyama et al. ........... | 181/200 |
| 6,496,248 B2 | * | 12/2002 | Tanaka ........................ | 355/72 |
| 2003/0026904 A1 | * | 2/2003 | Yadav et al. ................ | 427/294 |

FOREIGN PATENT DOCUMENTS

| | | |
|---|---|---|
| EP | 1041605 | 10/2000 |
| GB | 577231 | 5/1946 |
| WO | WO 9107683 | 5/1991 |

* cited by examiner

Primary Examiner—Diego Gutierrez
Assistant Examiner—Amy R. Cohen
(74) Attorney, Agent, or Firm—David N. Lathrop, Esq.; Gallagher & Lathrop

(57) ABSTRACT

A measuring system including a linear gauge 8 is placed on a vibration isolation table 7, and this system assembly is placed in a temperature controllable, constant-temperature chamber. A specimen table 16, which has a centrally-disposed circular protrusion 16C of a diameter sufficiently smaller than a specimen under measurement, is mounted on a surface plate 2 of a linear gauge 8. The position of a measuring element 1 is measured when it is brought into contact with the centrally-disposed circular protrusion 16C, and the position of the measuring element 1 is measured when it is brought into contact with the specimen placed on the specimen table. The measured values are used to determine the thickness of the specimen.

2 Claims, 15 Drawing Sheets

THICKNESS MEASURING APPARATUS AND METHOD

BACKGROUND OF THE INVENTION

The present invention relates to a method and apparatus for measuring the thicknesses of various materials efficiently and precisely.

At present, it is a laser thickness measuring machine for block gauge calibration use that is traceable and capable of measuring material thicknesses with the highest precision. Because of its application specified for block gauge measurements, however, the laser thickness measuring machine has a limitation on the size of the specimen to be measured. Further, the laser thickness measuring machine calls for sufficient knowledge and much skill, in particular, for precise measurement of the thickness of a transparent material like glass or a silicon (Si) single crystal with oxidized surface, since a phase shift occurs when the laser light is reflected from such a measuring object or specimen. Additionally, the laser thickness measuring machine is expensive.

For the reasons given above, a contact measuring method is widely used to measure the thicknesses of various materials through utilization of a linear gauge or the like. A conventional measuring system using such a method comprises, as depicted in FIG. 1, a measuring element 1, a thickness surface plate 2, and, if necessary, an auxiliary jig 4 that is used to provide increased repeatability or accuracy of measurement. The measuring system is placed on a vibration isolation table, and the measurement is conducted in a constant temperature room. The measuring temperature is usually 20±1° C., preferably, 20±0.5° C. for measurement with higher accuracy. An ordinary measurement procedure begins with bringing the measuring element 1 into contact with the surface of the surface plate 2 as depicted in FIG. 1A (or the auxiliary jig 4 in FIG. 1C) to define a reference point for measurement. The next step is to place a measuring object or specimen 3 on the surface plate 2 as depicted in FIG. 1B (or the auxiliary jig 4 in FIG. 1C), followed by bringing the measuring element 1 into contact with the specimen 3. Disposed between the surface plate 2 and the specimen 3 in FIG. 1C is the auxiliary jig 4 that has a vacuum-suction capability and hence ensures fixing the specimen 3 for stable measurement. In this instance, the thickness of the specimen 3 is measured as the distance from the reference point to the tip of the measuring element 1.

In many cases, the accuracy of the linear gauge in the thickness measuring machine using the above-described method is used intact as the accuracy of the thickness measurement.

In the actual measuring system, however, the accuracy of measurement is influenced, for example, by the rigidity of a thickness gauge stand, or the flatness of the surface plate 2, the flatness and parallelism of the auxiliary jig 4 and the specimen 3, and a warp in the specimen 3. The specimen 3 may sometimes be measured while left curved as depicted in FIG. 2. The measuring accuracy is affected as well by distortion of the specimen 3 that is caused by its contact with the measuring element 1 or auxiliary jig 4. This incurs the possibility that the difference between the measured value and the true thickness of the specimen 3 is fairly larger than the accuracy guaranteed by the measuring system.

Further, a stable measuring environment is indispensable for accurate thickness measurement, but occasionally the prior art does not give due consideration in this respect. In particular, the stability of the measuring temperature, the absence or presence of vibration, and the cleanness of the measuring room greatly affect the accuracy of measurement, and hence much attention should be paid to them. The measurement is usually carried out in a constant temperature room, and the stable point of room temperature varies with the numbers of people and in-service devices in the room, and the local temperature in the room fluctuates with comings and goings of people and ON/OFF operations of devices installed in the room. On this account, the temperature stable point during measurement, which affects the accuracy of measurement, undergoes about ±1° C. variations with measurement conditions, allowing temperature fluctuations during measurement. For example, in the case of measuring a block gauge of a 10 mm nominal size [Literature 1] with a ±0.5° C. temperature stability, its linear expansion coefficient of approximately $±10^{-5}$ $K^{-1}$ may sometimes cause a measurement error of around ±0.05 μm.

As described above, the prior art has many problems that should be taken into account for contact thickness measurement with "high accuracy," and hence it does not allow ease in measuring accurately to ±0.1 μm.

SUMMARY OF THE INVENTION

It is therefore an object of the present invention to provide a method and device for measuring absolute values of the thicknesses of various materials efficiently and precisely.

The thickness measuring apparatus according to the present invention comprises:

a constant-temperature chamber;

a vibration isolation table placed in said constant-temperature chamber;

a linear gauge provided with a surface plate mounted on said vibration isolation table and a measuring element for contacting a specimen under measurement mounted on said surface plate from above, for outputting information about the position of said measuring element; and a specimen table mounted on said surface plate and having a centrally-disposed circular protrusion for receiving said specimen, said centrally-disposed circular protrusion having a flat surface of a diameter sufficiently smaller than said specimen.

The thickness measuring method according to the present invention comprises the steps of:

(a) bringing down said measuring element of said linear gauge from above into contact with a centrally-disposed circular protrusion of a specimen table mounted on said surface plate to measure the position of said measuring element as a first position, said centrally-disposed circular protrusion having a diameter sufficiently smaller than said specimen;

(b) mounting said specimen on said centrally-disposed circular protrusion and bringing down said measuring element of said linear gauge from above into contact with said specimen to measure the position of said measuring element as a second position; and (c) calculating the thickness of said specimen from the first and second positions.

DETAILED DESCRIPTION OF THE PREFERRED EMBODIMENTS

A description will be given first of stabilization of the measurement environment.

Figure 3:
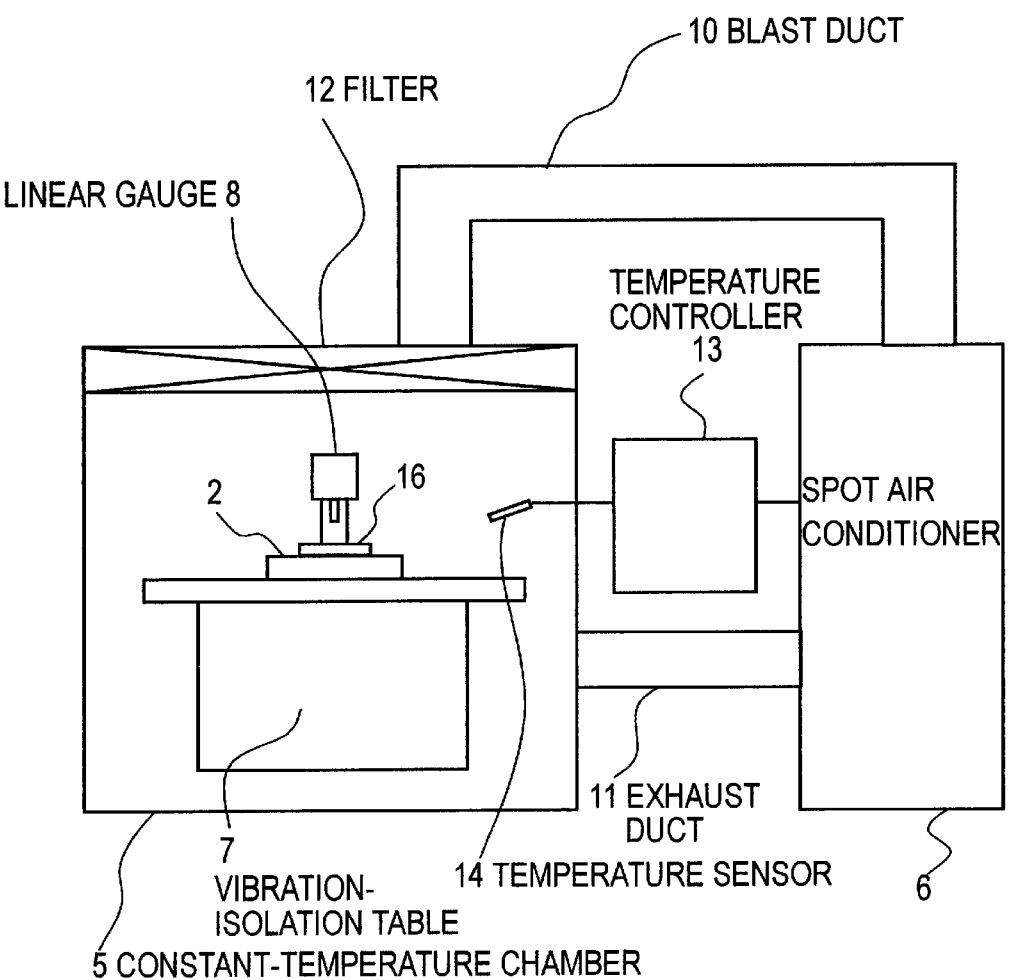
FIG. 3 is a diagram schematically illustrating an embodiment of the present invention intended to stabilize measuring environments.

FIG. 3 is a schematic diagram illustrating the entire structure of the thickness measuring apparatus according to the present invention. The thickness measurement is conducted in a constant-temperature chamber 5 held in a clean environment. This excludes the influence of dust and hence provides increased measuring accuracy and avoids the need for cleaning a linear gauge 8 and a specimen under measurement 3 (not shown), raising the working efficiency as well. The entire measuring system including the linear gauge 8 is mounted on a vibration isolation table 7 to exclude the influence of vibration on measurement. Further, the measuring system and the vibration isolation table 7 are placed in their entity in the constant-temperature chamber 5.

The temperature in the constant-temperature chamber 5 can be set at a desired value by a temperature controller 13 of temperature settings from 18 to 28° C. with 0.001° C. resolution. The temperature in the constant-temperature chamber 5 is measured by a temperature sensor 14 using a platinum resistance thermometer, and the measured value is provided to the temperature controller 13. From the top of the constant-temperature chamber 5, temperature-controlled air is supplied by a spot air conditioner 6 into the chamber 5 through a blast duct 10 and a filter 12. The filter 12 not only removes dust in the air but also serves as a buffer against the supplied airflow to make it uniform and consistent. The air discharged from the lower portion of the chamber 5 is returned to the spot air conditioner 6 through an exhaust duct 11. The air returned to the spot air conditioner 6 is cooled by a cooler disposed therein and then heated again by a heater. The air supplied from the spot air conditioner 6 is subjected to PID (Proportional plus Integral plus Derivative) control by the temperature controller 13 so that the temperature at the position of the temperature sensor 14 (at the control point) in the constant-temperature chamber 5 always remains at the set value.

Needless to say, the temperature stability in the chamber 5 can be further increased by using a material of excellent thermal isolation for the chamber 5 and stabilizing the temperature outside it. With the temperature in the chamber 5 thus stabilized, it is possible to keep the temperature of the specimen 3 at a constant value, for instant, at 23±0.01° C., at all times, ensuring accurate measurements in a stable temperature environment. With the conventional measuring apparatus using only a constant-temperature room without the above-mentioned temperature control by the airflow, when the measuring temperature is changed from the reference temperature so as to measure the linear expansion coefficient or the like in the vicinity of room temperature, temperature stabilization consumes much time, causing the problem of putting an appreciable load on a measurer; but the FIG. 3 structure permits reduction of the time for temperature stabilization, and hence facilitates measurements.

Figure 4:
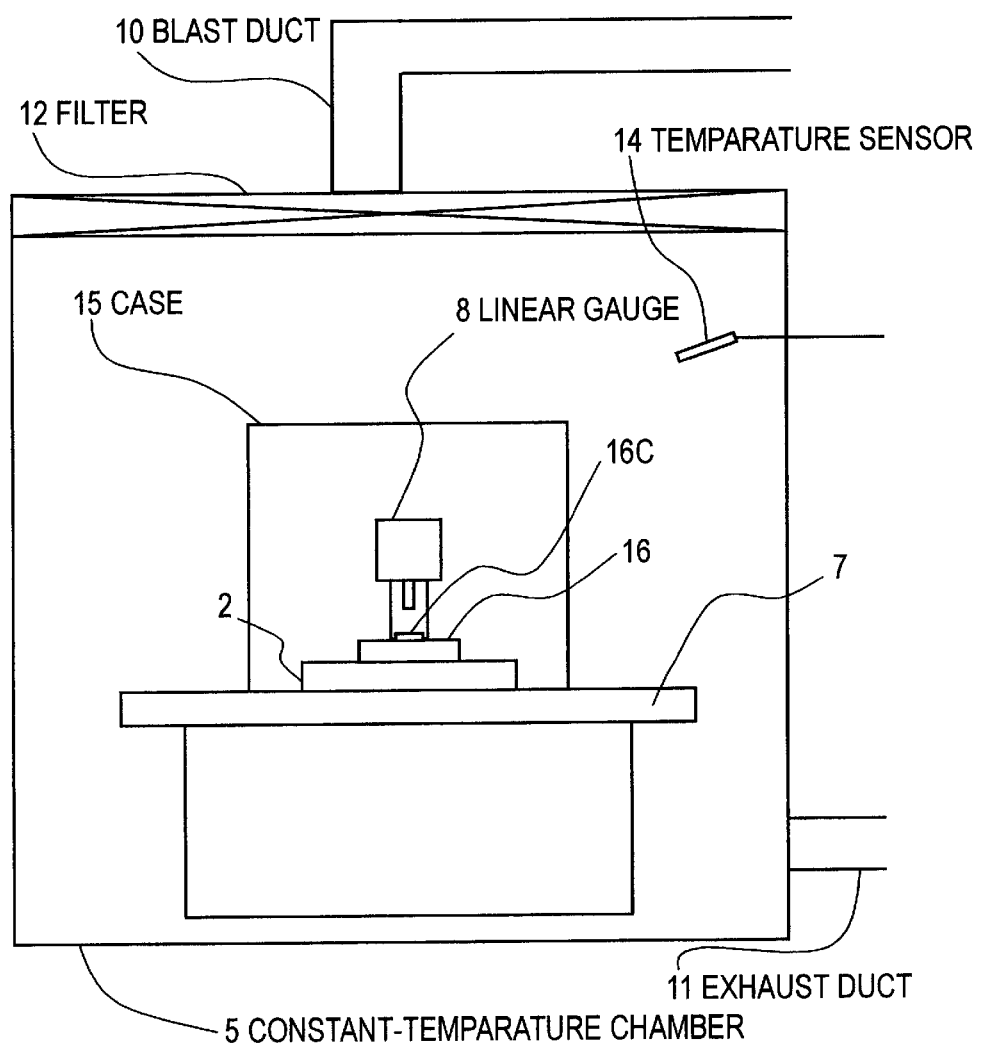
FIG. 4 is a diagram schematically depicting another embodiment of the present invention intended for further stabilization of temperature by covering the measuring element and the specimen under measurement with a case or the like to place them in a closed or semiclosed space.

FIG. 4 is a schematic showing of the inside of the temperature-constant chamber 5 depicted in FIG. 3. The surface plate 2 of the linear gauge 8 is placed on the vibration isolation table 7, and a specimen table 16 having a circular central protrusion 16C is mounted on the surface plate 2. Disposed above the specimen table 16 is a vertically moving measuring element 1 of the linear gauge 8. The specimen under measurement 3 is placed, though not shown, on the central protrusion 16C of the specimen table 16. By covering the linear gauge 8, the specimen table 16 and their surroundings with a case 15 made using polyethylene or plastics film, or acrylic plate to keep them in a semiclosed space as shown in FIG. 4—this excludes the influence of the airflow in the chamber 5, ensuring further temperature stabilization. With the measuring system placed in its entirety in a constant-temperature clean room, it is possible to further improve the measuring environment and hence provide increased reliability in measurements.

Figure 5A:
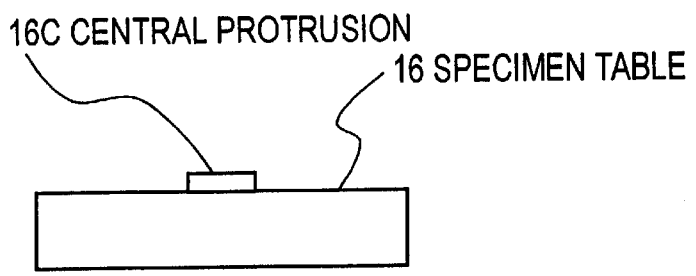
FIG. 5A is a side view of a specimen table for use in the present invention.
Figure 5B:
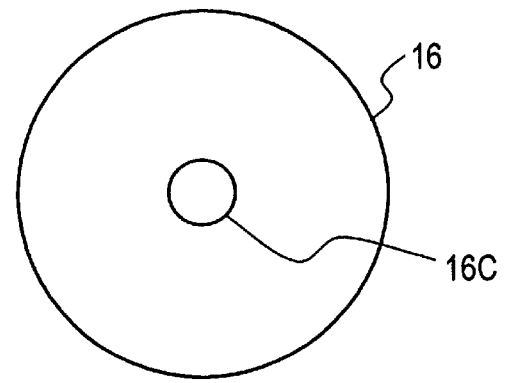
FIG. 5B is its plan view.
Figure 5C:
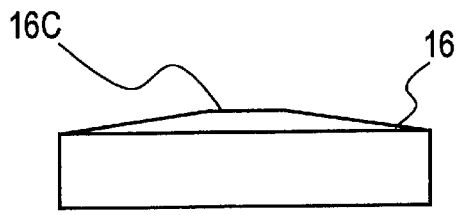
FIG. 5C is a schematic diagram of another example of the specimen table.

The specimen table 16, on which the specimen 3 is mounted for measuring its thickness, is intended to reduce errors in the measuring system. FIG. 5A is a side view of the specimen table 16 and FIG. 5B is its plan view. The specimen table 16 has the protrusion 16C protruding centrally thereof from the table surface optically polished with high flatness and parallelism. In the illustrated example, the circular central protrusion 16C is formed by etching so that it is about 8 mm across and tens of micrometers ($\mu$m) high. Alternatively, the central protrusion 16C may be tapered outwardly in its radial direction as depicted in FIG. 5C.

Figure 6:
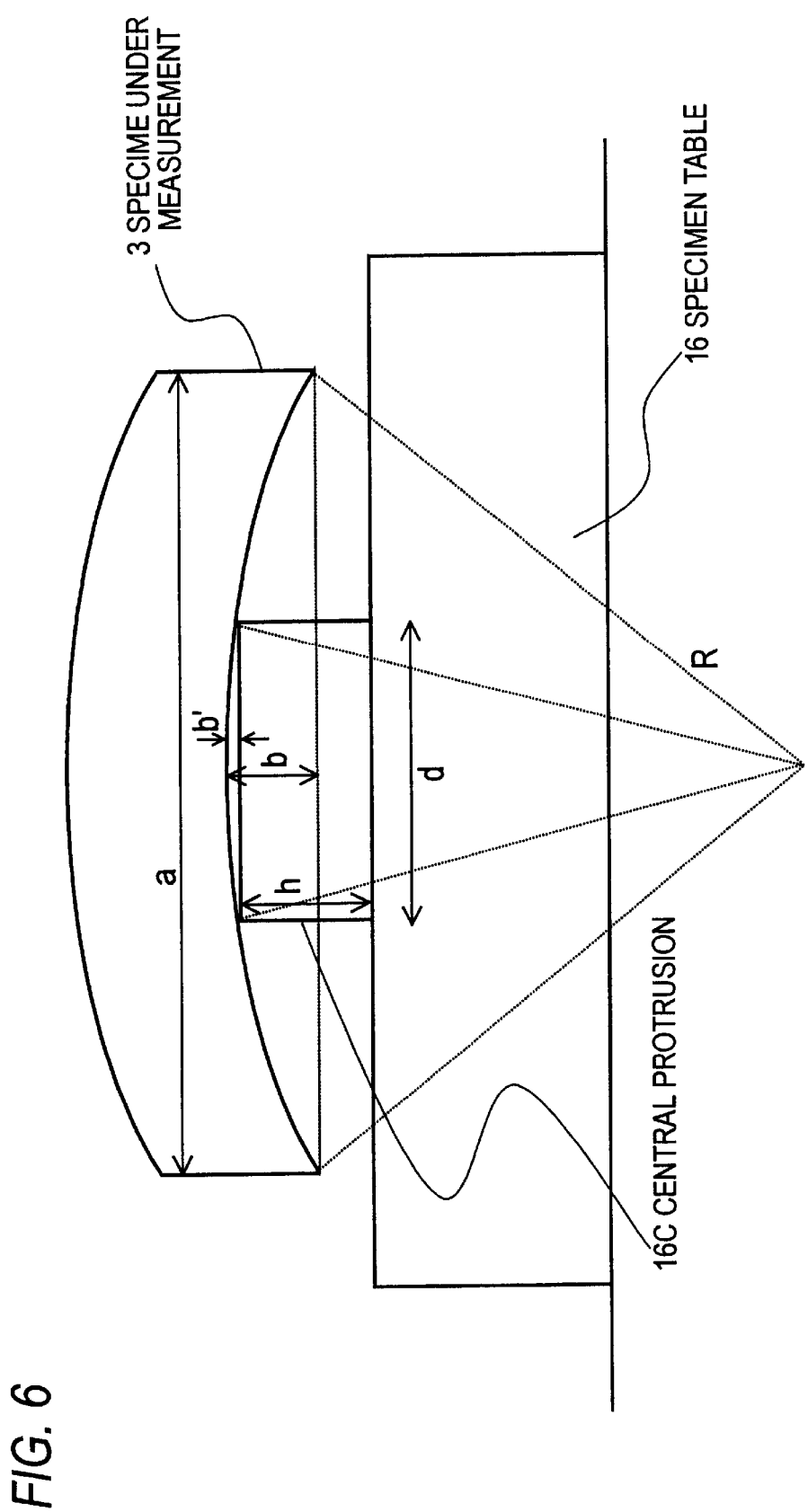
FIG. 6 is a diagram explanatory of dimensions of the specimen table.

The diameter and height of the central protrusion 16C need to be within the following ranges. In such a model as depicted in FIG. 6, the radius of curvature R of warp of the specimen 3 is given by the following equation.

$$R = \frac{(a/2)^2 + b^2}{2b} \approx \frac{1}{2b}\left(\frac{a}{2}\right)^2 \quad [\text{mm}] \quad (1)$$

where a is the size of the specimen and b is the severity of warp. Setting a permissible error b' at 0.05 $\mu$m, the diameter d of the central protrusion 16C needs to be within such a range as given by the following equation, $$d < 2\sqrt{1.0 \times 10^{-4} R - 2.5 \times 10^{-5}} \approx \frac{1}{50}\sqrt{R} \quad [\text{mm}] \quad (2)$$

Assuming that the specimen is a disc approximately 50 mm$\phi$ in diameter and the value b of warp is 2 $\mu$m or so, it follows from Eq. (2) that the diameter d of the central protrusion 16C of the specimen table 16 must be less than about 8 mm. The height h of the central protrusion 16C needs to be larger than the magnitude b of warp; it is recommended that the height h be 10 $\mu$m or more so as to ensure accurate measurement until b=5 $\mu$m. At any rate, it is necessary that the central protrusion 16C be sufficiently smaller in diameter than the specimen 3 and sufficiently larger in height than the warp of the specimen 3.

By minimizing the direct contact area with the specimen 3, it is possible to minimize the influence of the flatness and parallelism of the specimen 3 and the specimen table 16 or the surface configuration of the specimen 3 on the measurement, enhancing the repeatability of the measurement. It is desirable that the specimen table 16 be made of the same material as that of the specimen 3 for the reasons given later on.

Figure 7:
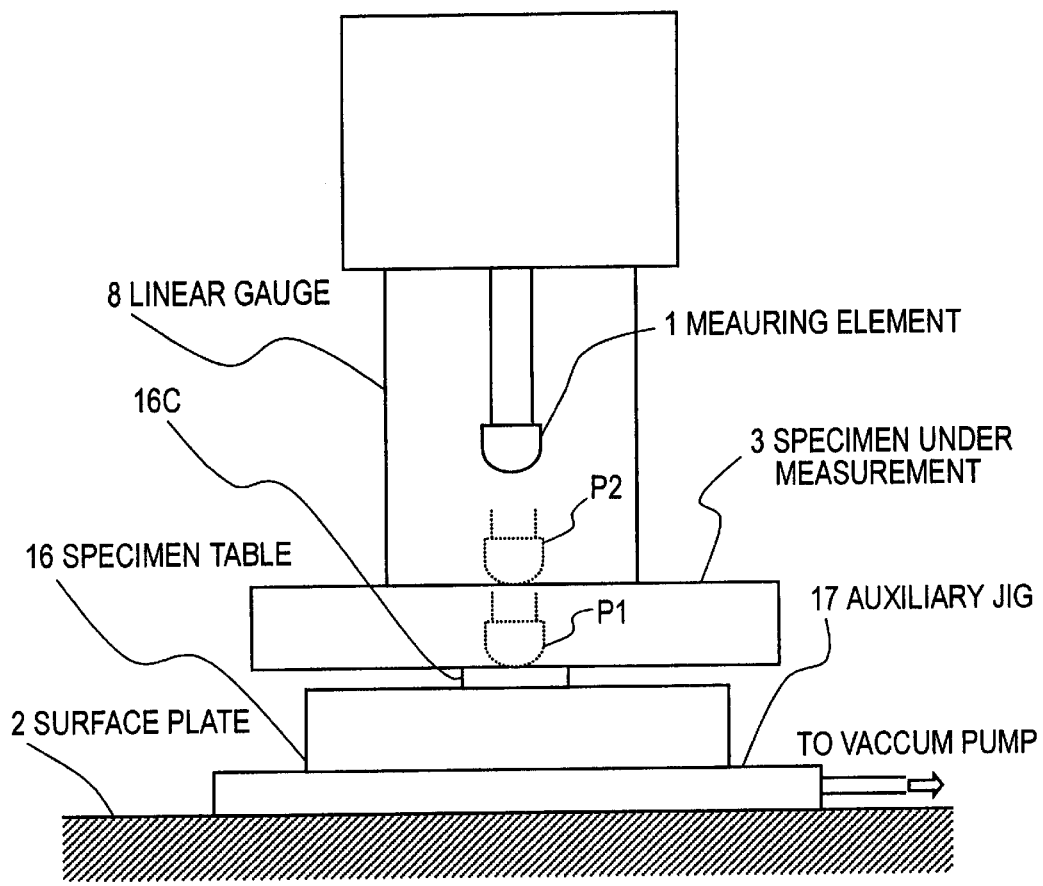
FIG. 7 is a schematic diagram for explaining the thickness measuring method according to the present invention.

Now, a description will be given, with reference to FIG. 7, of the thickness measuring method in the case of using the specimen table 16. The specimen table 16 is firmly fixed to the surface plate 2 by means of an auxiliary jig 17 that possesses a double-sided vacuum suction capability. The specimen table 16 thus held tightly on the surface plate 2 ensures stabilization of measured values and provides enhanced repeatability of measurement. To begin with, the measuring element 1 is extended down into direct contact with the central protrusion 16C of the specimen table 16 under a fixed load as indicated by the broken lines P1. Then, a counter of the linear gauge 8 is reset to a reference point (zero point). Next, the measuring element 1 is brought up, and the specimen 3 is placed on the central protrusion 16C of the specimen table 16, after which the measuring element 1 is brought down again into direct contact with the specimen 3 under the same load as mentioned above as indicated by the broken lines P2.

When the specimen 3 is a transparent material, an abnormality in the state of contact between the specimen table 16 and the specimen 3 due to warp of the latter can be detected through observation of the shape of an interference fringe.

Hence, the state of contact between the specimen 3 and the specimen table 16 can be checked, and consequently, highly reliable measurements can be achieved. The thickness of the specimen 3 is measured as the distance from the reference point to the point of the measuring element 1. After this, the specimen 3 is removed from the specimen table 16, then a check is made to see if the reference point goes back to zero, and the measurement is completed. If the reference point does not return to zero, it is regarded that an error occurred during measurement, and the data obtained in this session of measurement is not used. This procedure is repeated to verify the repeatability of measurement and the measuring accuracy.

Next, a description will be given of an example of thickness measurement using the specimen table 16 according to the present invention. This example used a linear gauge having an accuracy of ±0.03 $\mu$m and a resolution of ±0.005 $\mu$m. The linear gauge used allows its contact pressure for measurement to change to 0.91, 104, 1.07, 1.22 and 1.5 N. The tip of the measuring element 1 was made of a superhard alloy of the tungsten carbide series and its curvature of radius $R_0$ was 1.6 mm. The specimen table 16 was made of synthetic quartz glass. The specimen 3 was a synthetic quartz glass substrate. The temperature near the specimen 3 during measurement was set at 23° C. or so. For the purpose of comparison, the specimen 3 was measured by the conventional method that did not use the specimen table 16.

Figure 1A:
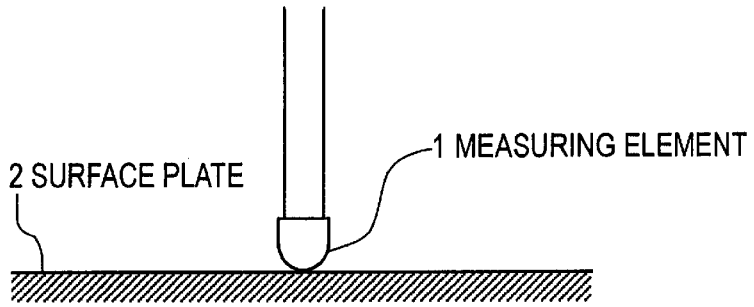
FIG. 1A is a diagram schematically showing the state in which a measuring element is held in contact with a measuring gauge surface plate according to a conventional thickness measuring method.
Figure 1B:
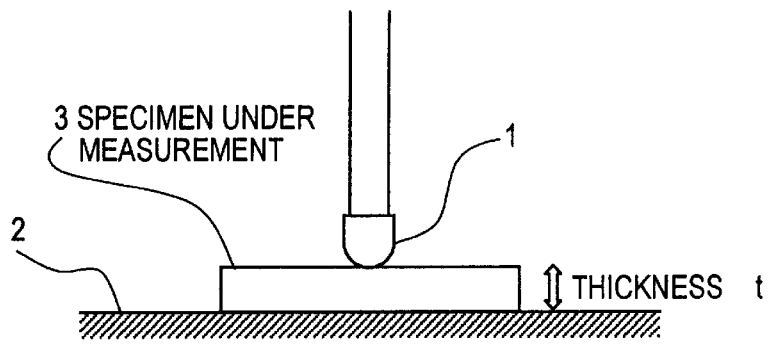
FIG. 1B is a diagram schematically showing the state in which the measuring element is held in contact with a specimen under measurement.
Figure 1C:
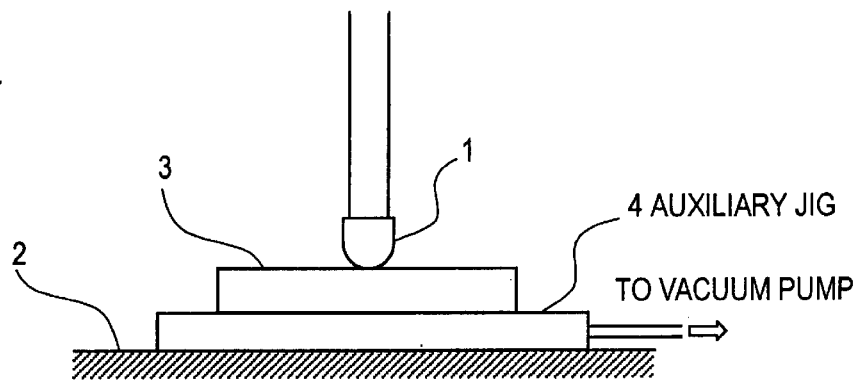
FIG. 1C is a diagram schematically showing an example of using an auxiliary jig for measurement.
Figure 2:
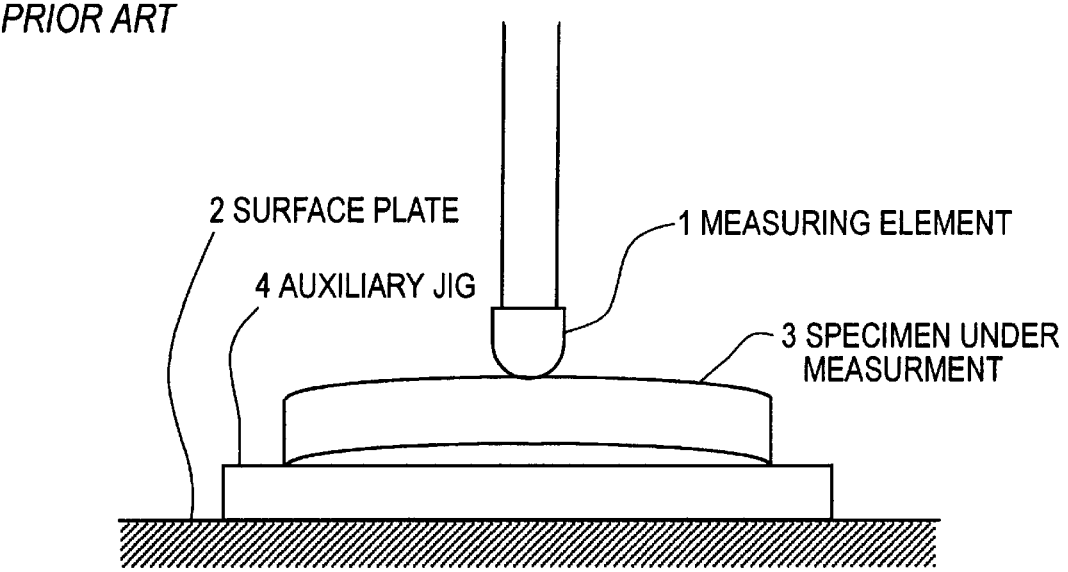
FIG. 2 is a schematic diagram explanatory of problems of the conventional measuring method.
Figure 8:
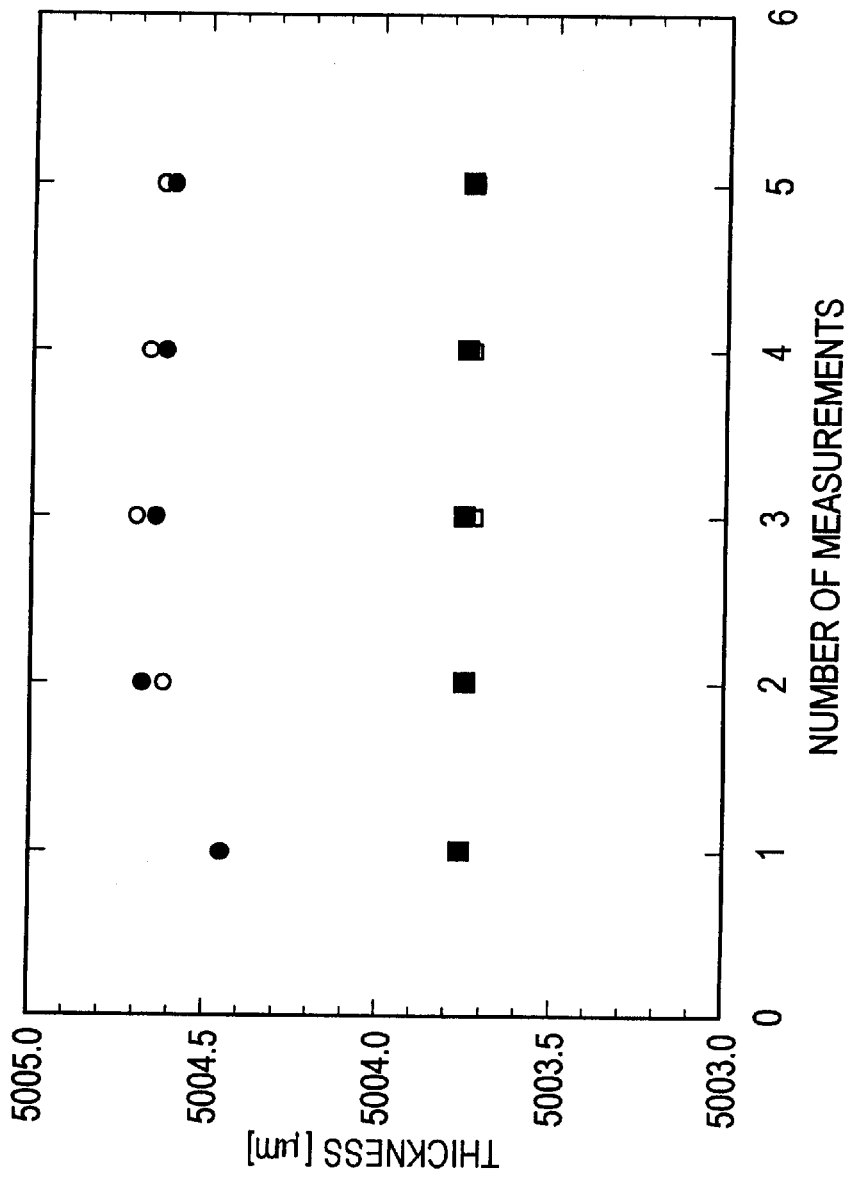
FIG. 8 is a graph showing the measured values of the thickness of a synthetic quartz glass substrate by a conventional method and by this invention method.

Since the specimen 3 is warped in some cases as shown in FIG. 2, thickness of the specimen 3 was measured a total of 10 times: 5 times with the one side upward and 5 times the other side upward. The contact pressure for measurement was set at 0.91 N. FIG. 8 shows the measured results. The temperature near the specimen during measurements always remained constant at 22.97±0.09° C. In each measurement the counter of the linear gauge 8 was in a stable condition with the highest resolution displayed stably at 0.005 $\mu$m. In FIG. 8, the circles indicate the measured values obtained by repeatedly measuring the thickness of the specimen 3 with the conventional method. The repeatability of measurement by the prior art method was ±0.15 $\mu$m or so, and the average value of the measured values was 5004.60 $\mu$m. The squares indicate measured value obtained by repeatedly measuring the thickness of the specimen 3 placed on the specimen table 16 according to the present invention. The white squares indicate the measured value obtained with the surface of the specimen 3 held upward, whereas the black squares indicate the measured value obtained with the back of the specimen 3 held upward. The repeatability was approximately ±0.02 $\mu$m and the average value of the measured was 5003.75 $\mu$m.

No substantial differences are found between the thickness-measured values indicated by the white and black squares, which demonstrates the effect of the specimen table according to the present invention. If the difference in repeatability between the two kinds of measured values is in excess of ±0.02 $\mu$m or so, however, it is considered that slight warpwarp of the specimen affected the measurement, and the measured value smaller than the other should be adopted. The measured values by the present invention method are smaller around 1 $\mu$m than the measured value by the conventional method, and it can be seen that the repeatability of the measured values obtained with the specimen 3 repeatedly mounted on the specimen table 16 is also higher than the repeatability by the prior art method.

Next, a description will be given of the influence of distortion on the thickness measurement.

Figure 9:
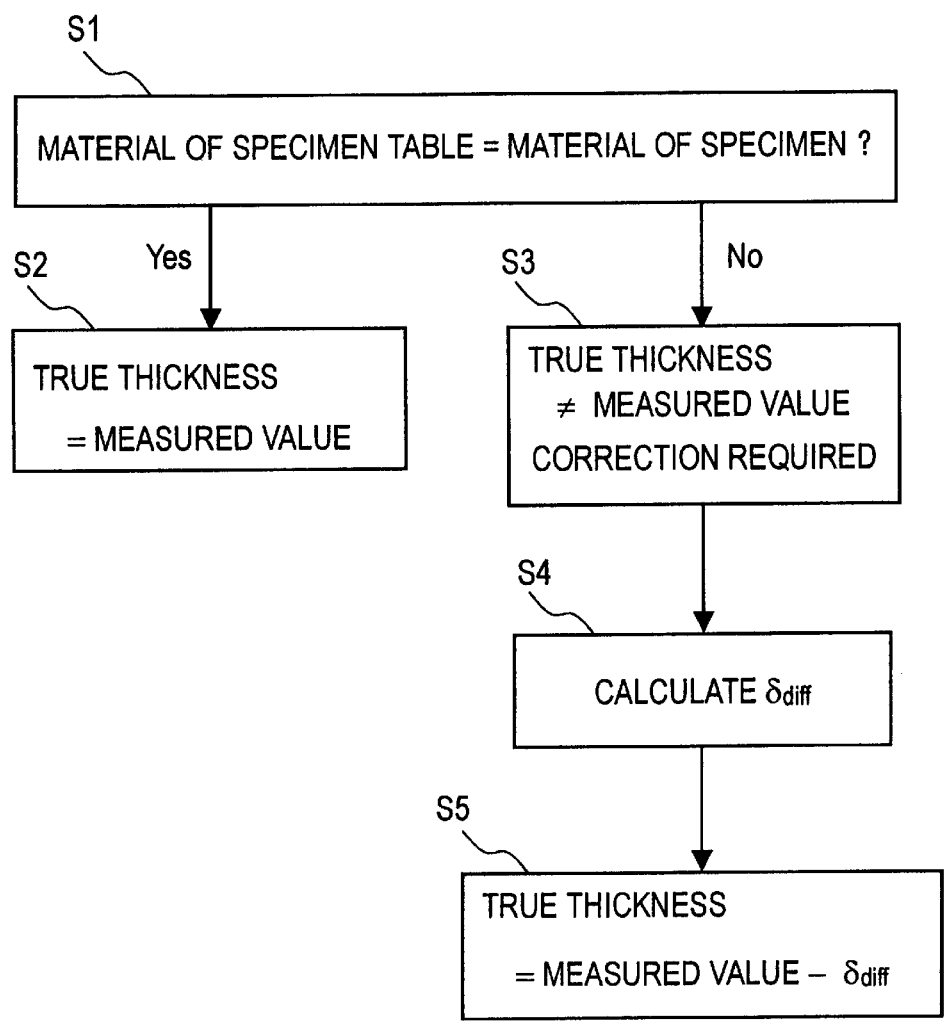
FIG. 9 is a flowchart for explaining how to correct measured value for the influence of distortion caused by the contact of the measuring element with the specimen and the specimen table.

To measure the true thickness of the specimen 3, it is necessary to exclude the influence of distortion caused by the contact of the measuring element 1 with the specimen table 16 and the specimen 3. A method for excluding the influence of such distortion on the measurement will be described below. FIG. 9 is flowchart showing the procedure to be followed to correct measured values.

In the first place, the materials of the specimen table 16 and the specimen 3 are checked (step S1). When the specimen table 16 and the specimen 3 are made of the same material, the amounts of distortion occurring in them are equal, and consequently, the influences of distortion are cancelled each other. Accordingly, the measurement value is not affected by distortion, and hence it need not be corrected (step S2). When the specimen table 16 and the specimen 3 are made of different materials, the amounts of distortion occurring in them differ due to the difference in elastic characteristics between their materials. In this instance, the measurement value is affected by distortion, and hence needs to be corrected (step S3). The amount of distortion is given by the following equation called Hertz's formula.

$$\delta = \sqrt[3]{\frac{9}{16} \frac{1}{R_0} \left( \frac{1-\sigma_1^2}{E_1} + \frac{1-\sigma_2^2}{E_2} \right)^2 P^2} \quad (3)$$

where $\delta$ is distortion, $R_0$ is the curvature of radius of the tip of the measuring element 1, $\sigma_1$ and $\sigma_2$ are Poisson's ratios, $E_1$ and $E_2$ are Young's moduli, and P the contact pressure for measurement. The suffix 1 denotes the measuring element 1 and 2 denotes the object (the specimen table 16 or specimen 3) contacted by measuring element 1.

Figure 10B:
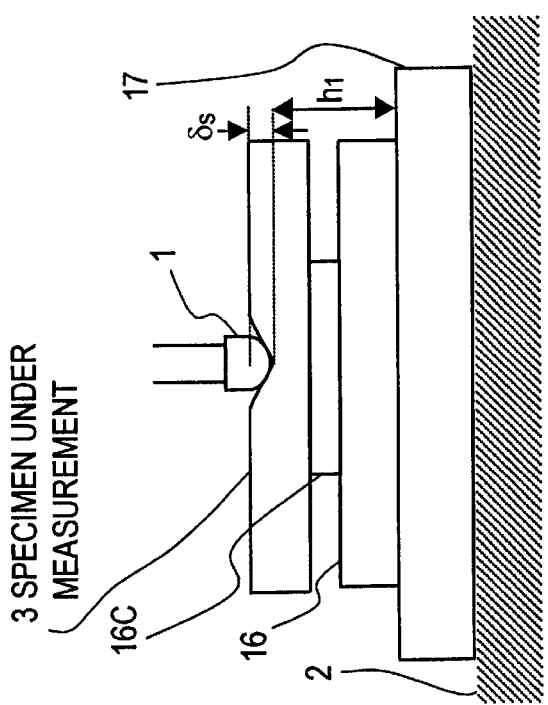
FIG. 10B is a schematic diagram for explaining the measurement of the position of the measuring element on the specimen when the latter is placed on the specimen table.
Figure 10A:
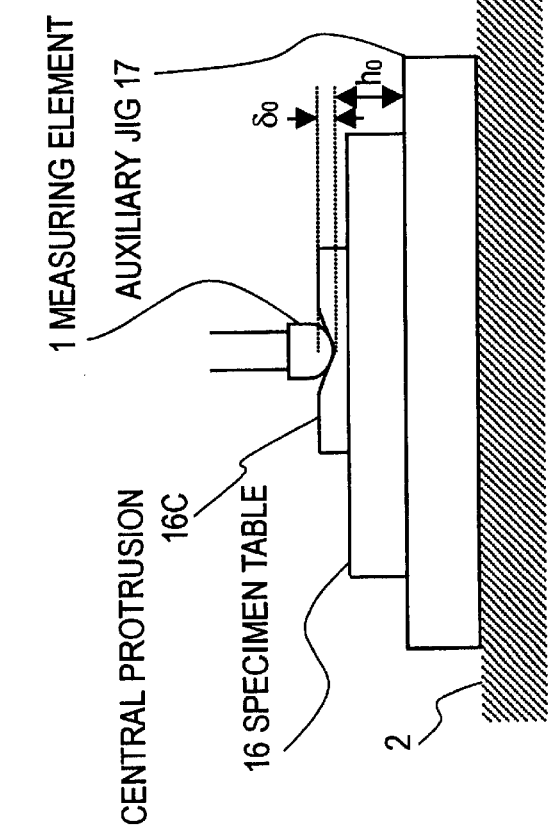
FIG. 10A is a schematic diagram for explaining the measurement of the reference position of the measuring element.

From the viewpoint of the measuring procedure, an error actually contained in the measurement value by distortion is such as described below. To begin with, the measuring element 1 is brought into contact with the specimen table 16 under a predetermined contact pressure as shown in FIG. 10A; and a distortion $\delta_0$ is calculated by Eq. (3) from the contact pressure and the height $h_0$ of the measuring element 1 is measured as a reference height. Next, the specimen 3 is mounted on the specimen table 16 and the measuring element 1 is contacted with the specimen 3 under the above-mentioned contact pressure as depicted in FIG. 10B. A distortion $\delta_S$ is calculated by Eq. (3) from the contact pressure and the height $h_1$ of the measuring element 1 is measured. The true thickness t of the specimen 3 and its measured value t' bear such a relationship as given by the following equation.

$$t = h_0 + \delta_0 - (h_1 + \delta_S) = t' - \delta_{diff} \quad (4)$$

When the specimen table 16 and the specimen 3 are made of the same material as referred to previously, $\delta_0 = \delta_S$, and $\delta_{diff} = 0$; hence, the measurement value need not be corrected for distortion. $\delta_{diff}$ can be calculated by the following equation by use of Eq. (3) (step S4).

$$\delta_{diff} = \delta_0 - \delta_S = \quad (5)$$
$$\sqrt[3]{\frac{9}{16R_0}\left(\frac{1-\sigma_1^2}{E_1} + \frac{1-\sigma_2^2}{E_2}\right)^2 P^2} - \sqrt[3]{\frac{9}{16R_0}\left(\frac{1-\sigma_1^2}{E_1} + \frac{1-\sigma_3^2}{E_3}\right)^2 P^2}$$

In Eq. (5), the suffix 1 denotes the measuring element 1, 2 denotes the specimen table 16, and 3 denotes the specimen 3. By subtracting the value $\delta_{diff}$ from the measurement value as given in Eq. (4), the true thickness can be obtained (step S5).

Figure 11:
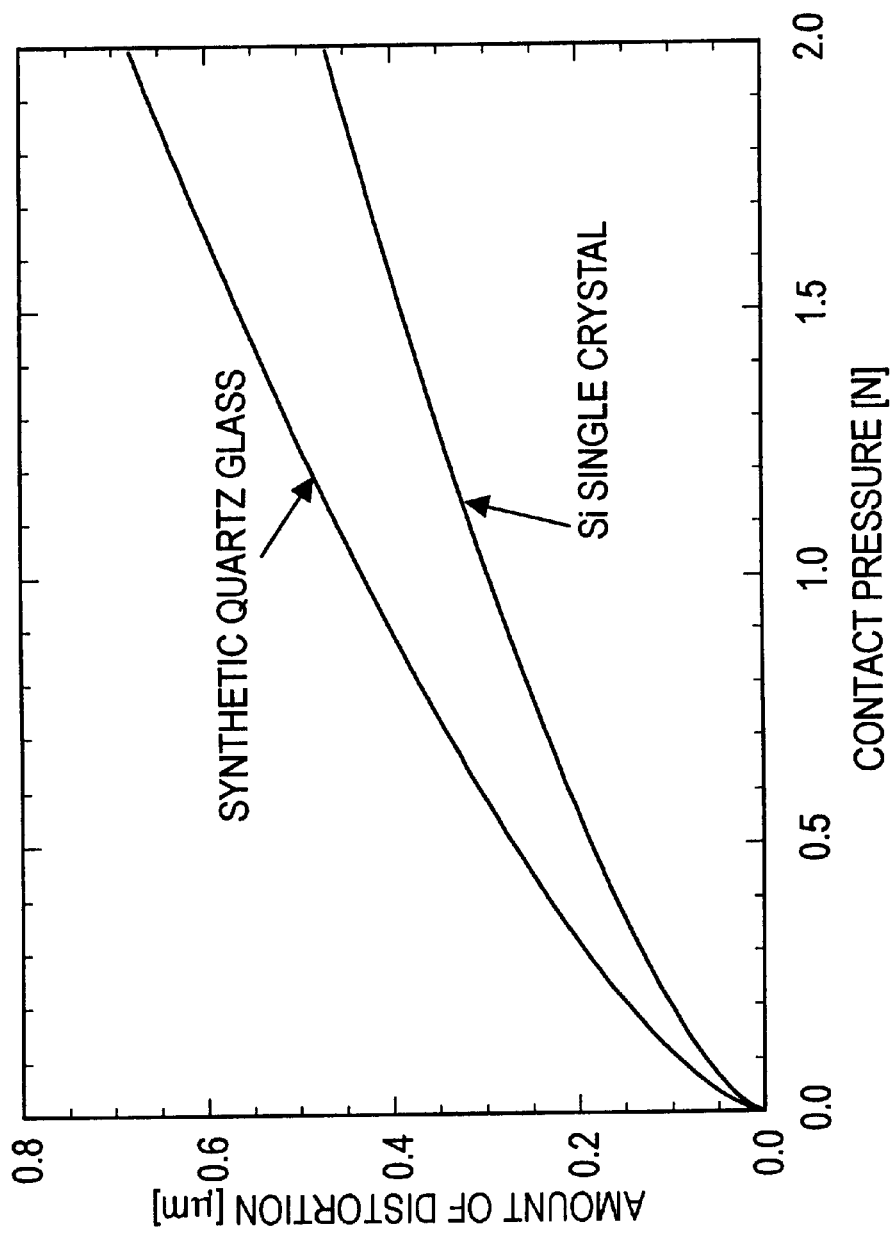
FIG. 11 is a graph showing numerical values of distortion caused by the contact of the measuring element with specimens of synthetic quartz glass and Si single crystal.

Incidentally, the Young's modulus and Poisson' ratio in the Hertz's formula are defined for isotropic materials but not defined for anisotropic materials. However, by use of equivalent Young's moduli and Poisson's ratios, the distortion can be mathematically computed or experimentally measured as described later on. FIG. 11 is a graph showing examples of numerically calculated values of distortion caused by the contact of the measuring element 1 with synthetic quartz glass and Si single crystal. The Young's modulus and Poisson's ratio of the synthetic quartz glass were set at $7.2 \times 10^{10}$ N/m² and 0.16, respectively, and the Young's modulus and Poisson's ratio of the Si single crystal were set at $13.0 \times 10^{10}$ N/m² and 0.28, respectively. The tip of the measuring element 1 was the same as used in the above-described measurements; that is, the tip was made of superhard alloy of the tungsten carbide series and its radius of curvature $R_0$ was 1.6 mm. The Young's modulus and Poisson's ratio of the tip of the measuring element 1 were $63.0 \times 10^{10}$ N/m² and 0.20, respectively. It is apparent from FIG. 11 that when contacted by the measuring element 1 under about 1 N that is the minimum contact pressure for measurement of the linear gauge 8, a distortion of around 0.43 μm occurs in the synthetic quartz glass and a distortion of about 0.30 μm occurs in the Si single crystal. These results suggest the influence of distortion needs to be taken into account to achieve high measurement accuracy within ±0.1 μm.

A description will be given of examples of correcting the distortion. The thickness measurements were conducted using the same measuring apparatus and measuring conditions as in the above. As the specimen 3, a synthetic quartz glass substrate and a (111) Si single crystal substrate were prepared. And two kinds of specimen tables 16 were prepared, one of which was made of synthetic quartz glass and the other of which was made of (111) Si single crystal. The thickness measurements were conducted with the contact pressure P changed to 0.91, 1.04, 1.07, 1.22 and 1.51 N.

Figure 12:
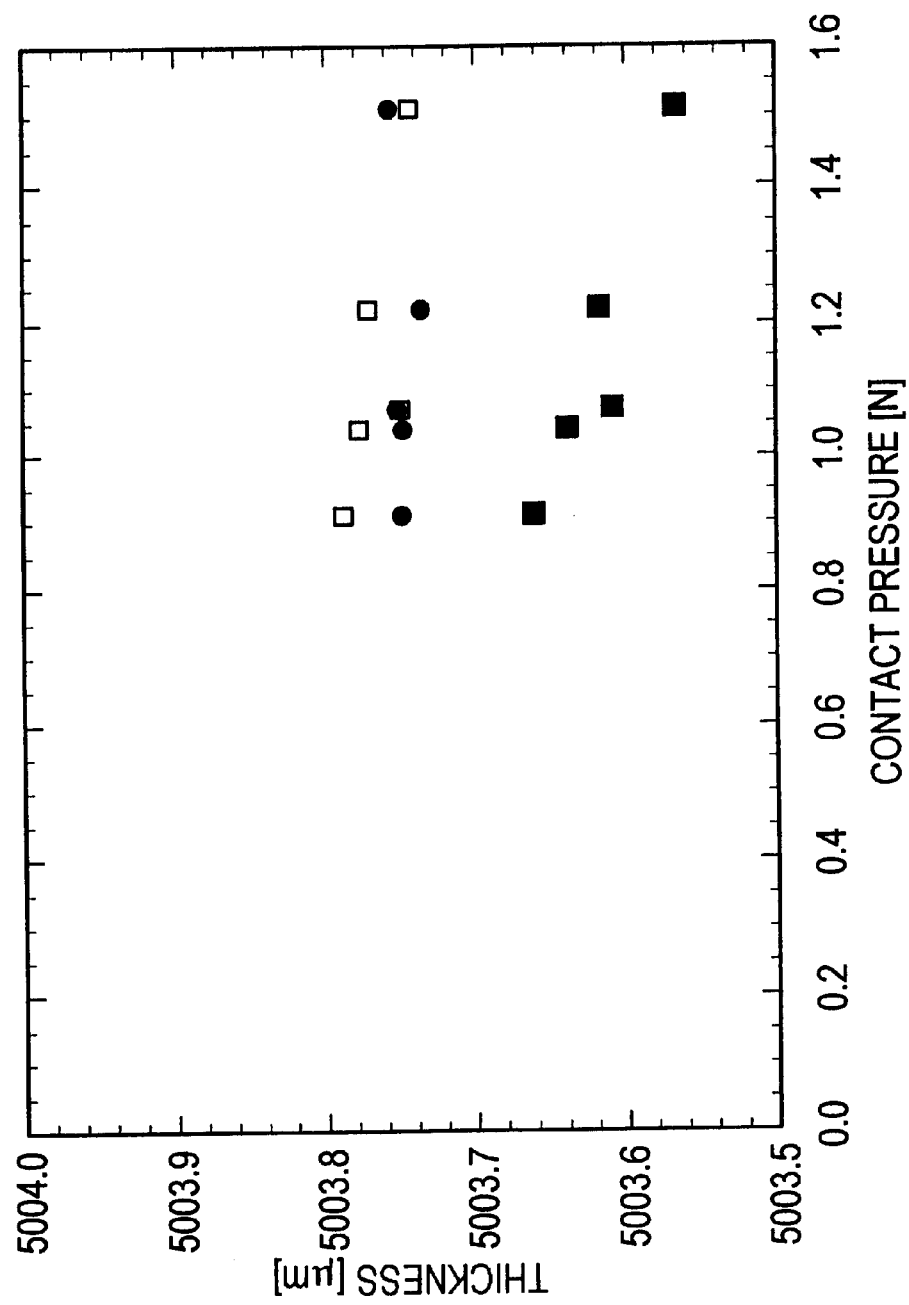
FIG. 12 is a graph showing the measured values of the thickness of a synthetic quartz glass substrate.
Figure 13:
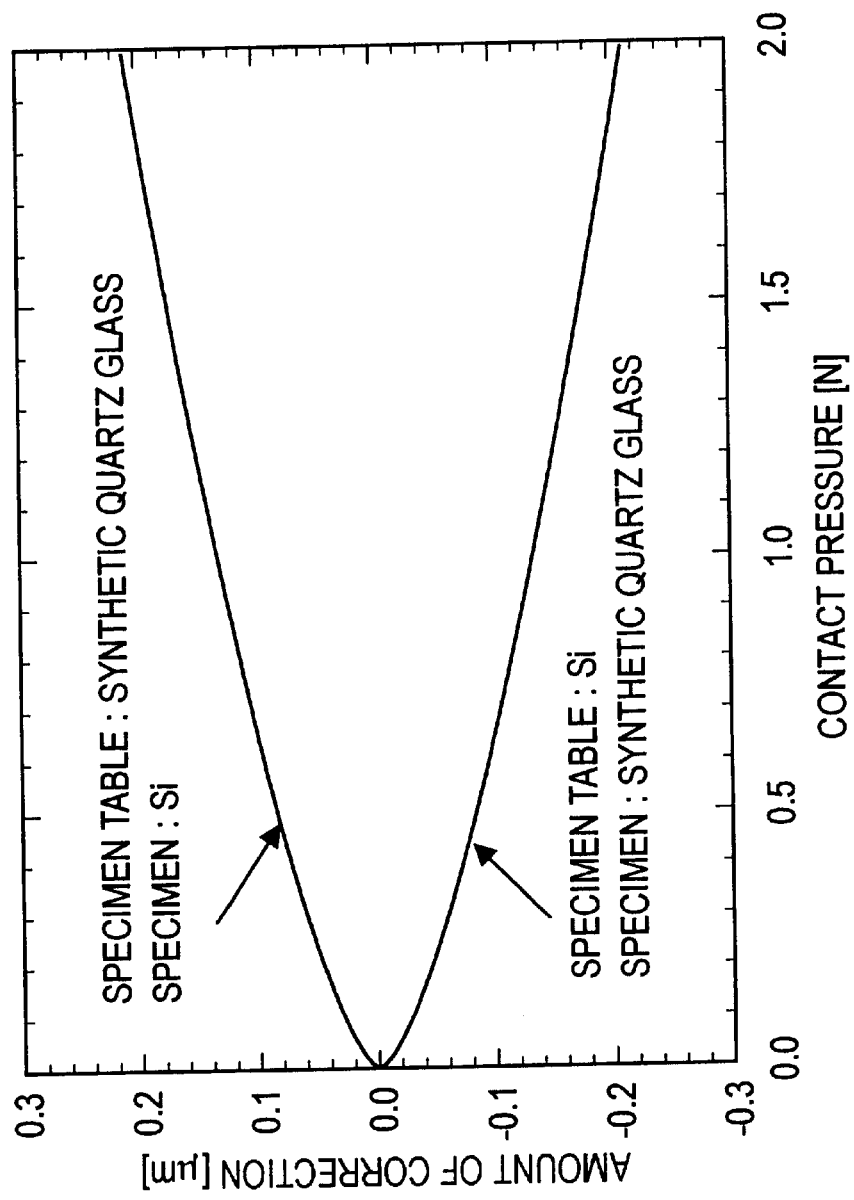
FIG. 13 is a graph showing calculated values of the amount of distortion when the thickness of the Si single crystal specimen was measured using a specimen table made of synthetic quartz glass and the amount of distortion when the thickness of the synthetic quartz glass specimen was measured using a specimen table made of Si single crystal.

In FIG. 12, black circles indicate the results of measurements conducted for the synthetic quartz glass substrate. When the specimen table 16 made of the synthetic quartz glass is used, no distortion compensation is required; the measured values hardly change with the contact pressure P and stay within the range of 5003.75±0.01 μm. When the specimen table 16 made of the Si single crystal is used, the measurement value varies with the contact pressure P as indicated by the black squares. In this instance, the measurement values are corrected for distortion. White squares indicate distortion-corrected values of the measurement values indicated by the black squares. FIG. 13 shows the amounts of correction, expressed by Eq. (5), that were calculated using the contact pressure P as a parameter. The Young's moduli and Poisson's ratios of the synthetic quartz glass and the Si single crystal were the same as those used in the above. The value $\delta_{diff}$ thus obtained is −0.14, −0.15, −0.15, −0.17 and −0.19 μm under the contact pressure P=0.91, 1.04, 1.07, 1.22 and 1.51 N. When corrected using these values, the measurement values became constant at 5003.78±0.02 μm independently of the contact pressure P. The value corrected for distortion is larger about 0.03 μm than in the case where the specimen table 16 made of synthetic quartz glass was used. This is considered due to the facts that wringing between the specimen table 16 and the specimen 3 changes with their materials and that the Young's modulus and Poisson's ratio of the Si single crystal are calculated on the assumption that it is isotropic material in defiance of its anisotropy. When it becomes possible to handle the Si single crystal taking its anisotropy into account, better correction will be expected.

Figure 14:
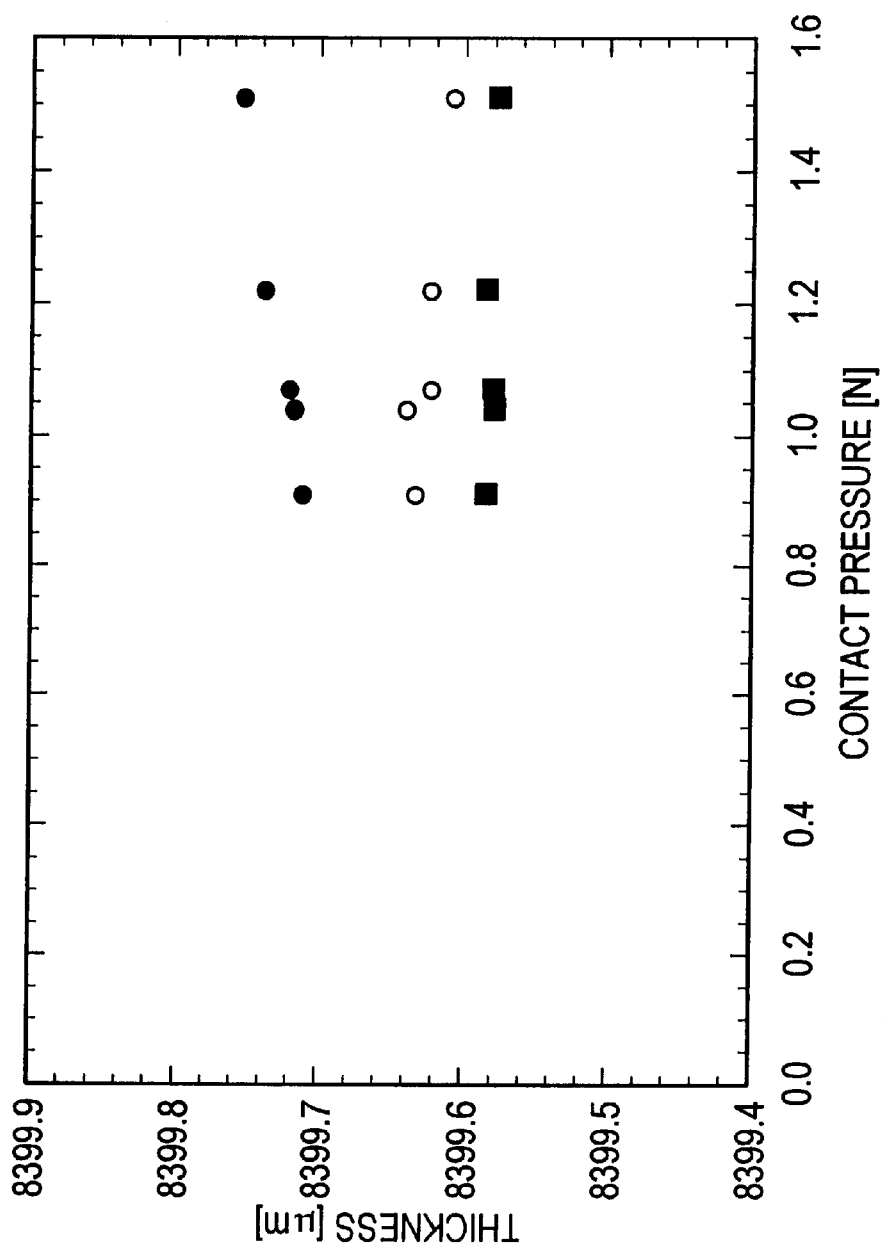
FIG. 14 is a graph showing the measured values of the thickness of a (111) Si single crystal substrate.

FIG. 14 shows measured results for the (111) Si single crystal substrate. The black circles indicate the values measured with the specimen table made of the synthetic quartz glass, and the white circles indicate the values obtained by correcting the black-circled values for distortion. The black squares indicate the values measured with the specimen table made of the Si single crystal. When the specimen table 16 made of the Si single crystal was used, the measured values hardly vary with the contact pressure P and are constant at 8399.62±0.01 µm. When the specimen table 16 made of the synthetic quartz glass was used, the measured value became constant at 8399.58±0.01 µm after corrected using the calculated values shown in FIG. 11. In this case, too, the measured values differ by about 0.04 µm for the reasons that the two specimen tables 16 were made of different materials and that the anisotropy of the single crystal was ignored as referred to previously.

The measurement results suggest that the specimen table 16 may preferably be identical in material and in cut plane with the specimen 3, but the above-described method permits reduction of the dependence of the measurement on the contact pressure P, achieving a measuring accuracy of ±0.1 µm or so. While in the above the synthetic quartz glass has been described as the material for the specimen table 16, other glass materials or ceramics that can be regarded as isotropic may also be used.

Measurements were conducted by this invention method on a block gauge that is a practical standard for length. A K-class block gauge of the highest calibration accuracy was used for measurement. The block gauge was made of zirconia ceramic, and its nominal size was 5 mm and nominal value was 5000.07 µm. The calibration accuracy at the standard temperature 20° C. is ±0.04 µm. The linear expansion coefficient is $9.3\pm1.0\times10^{-6}$ $K^{-1}$. The Young's modulus and Poisson's ratio of the block gauge are $21.1\times10^{10}$ $N/m^2$ and 0.30, respectively. The linear gauge 8 used was the same as in the measurements described above, and the measuring temperature was set at 20° C. that is the standard measuring temperature of the block gauge. The specimen table 16 was made of synthetic quartz glass. The contact pressure for measurement was changed to 0.91, 1.04, 1.07, 1.22 and 1.51 N.

Figure 15:
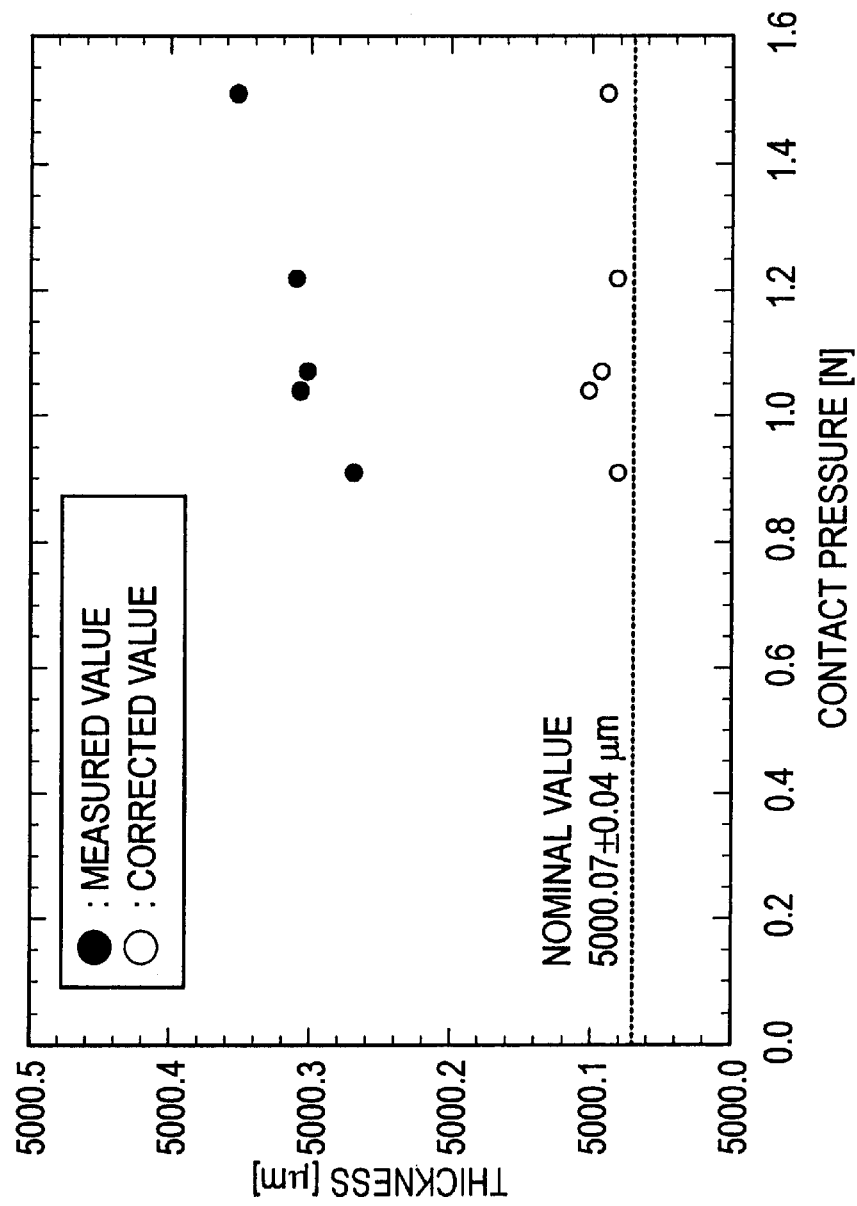
FIG. 15 is a graph showing measured results of Class K block gauge by this invention method.

FIG. 15 shows measurement results. The black circles indicate measured values and white circles indicate values obtained by correcting the black-circle measured values for distortion. The broken line indicates the nominal value of the block gauge. The temperature near the specimen 3 during measurement was constant at 19.98±0.09° C. An error in the measured thickness value by the temperature variation of about 0.1° C. is approximately 0.005 µm calculated from the linear expansion coefficient of zirconia ceramic. The repeatability of measurement was ±0.02 µm. It can be seen from FIG. 15 that the values measured under the respective contact pressures, corrected for distortion, are constant at 5000.09±0.01 µm. Since the nominal value is 5000.07 µm, the measured values agree with the nominal value with a difference of only 0.02 µm or so therebetween. The calibration accuracy of the block gauge is ±0.04 µm, from which it can be seen that the present invention permits high accuracy thickness measurements.

EFFECT OF THE INVENTION

As described above, according to the present invention, it is possible to conduct thickness measurement in a stable environment and lessen the influence of errors occurring in the measuring system and hence provide increased measurement repeatability and reliability. Further, the influence of distortion can be excluded by correction. Accordingly, the thicknesses of various materials can be measured efficiently and accurately, and the accuracy and repeatability of thickness measurement can be enhanced markedly.

What is claimed is:

1. A method for measuring the thickness of a specimen by use of a linear gauge provided with a surface plate and a measuring element, said method comprising the steps of:

(a) bringing down said measuring element of said linear gauge from above into contact with a centrally-disposed circular protrusion of a specimen table mounted on said surface plate to measure the position of said measuring element as a first position, said centrally-disposed circular protrusion having a diameter sufficiently smaller than said specimen, and calculating a first distortion caused by said contact of said measuring element with said centrally-disposed circular protrusion of said specimen table based on the pressure between said measuring element and said centrally-disposed circular protrusion of said specimen table and the properties of material for said specimen table and said measuring element;

(b) mounting said specimen on said centrally-disposed circular protrusion and bringing down said measuring element of said linear gauge from above into contact with said specimen to measure the position of said measuring element as a second position, wherein said specimen is supported entirely on said centrally-disposed circular protrusion, and calculating a second distortion caused by said contact of said measuring element with said specimen based on the pressure between said measuring element and said specimen and the properties of material for said specimen and said measuring element; and (c) calculating the thickness of said specimen from the first and second positions and correcting the measured thickness based on the difference between said first and second distortions.

2. The method of claim 1, wherein said specimen table is made of the same material as that of said specimen.

* * * * *